(12) United States Patent
Brockley

(10) Patent No.: US 9,777,651 B2
(45) Date of Patent: Oct. 3, 2017

(54) MANAGING SHIFT ENERGY IN A TRANSMISSION OF A VEHICLE

(71) Applicant: JAGUAR LAND ROVER LIMITED, Warwickshire (GB)

(72) Inventor: Nick Brockley, Coventry (GB)

(73) Assignee: JAQUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 15/032,084

(22) PCT Filed: Oct. 16, 2014

(86) PCT No.: PCT/EP2014/072196
§ 371 (c)(1),
(2) Date: Apr. 26, 2016

(87) PCT Pub. No.: WO2015/062869
PCT Pub. Date: May 7, 2015

(65) Prior Publication Data
US 2016/0265460 A1    Sep. 15, 2016

(30) Foreign Application Priority Data
Oct. 28, 2013 (GB) .................................. 1319018.6

(51) Int. Cl.
*F16H 63/50* (2006.01)
*F01L 1/14* (2006.01)
(Continued)

(52) U.S. Cl.
CPC ............ *F02D 41/0225* (2013.01); *F01L 1/14* (2013.01); *F01L 1/22* (2013.01); *F01L 9/04* (2013.01);
(Continued)

(58) Field of Classification Search
None
See application file for complete search history.

(56) References Cited

U.S. PATENT DOCUMENTS

| 4,133,332 A | 1/1979 | Benson et al. |
| 4,164,917 A | 8/1979 | Glasson |

(Continued)

FOREIGN PATENT DOCUMENTS

| CN | 102588128 A | 7/2012 |
| CN | 203130181 U | 8/2013 |

(Continued)

OTHER PUBLICATIONS

International Search Report and Written Opinion of the International Searching Authority for International application No. PCT/EP2014/072196 dated Jan. 23, 2015.

(Continued)

*Primary Examiner* — Justin Holmes
(74) *Attorney, Agent, or Firm* — Carlson, Gaskey & Olds

(57) ABSTRACT

A method and apparatus for continually and rapidly adjusting the output torque of an engine according to a torque demand uses an active tappet to vary the instant air charge in a combustion chamber, so as to modulate engine torque during an automatic change of speed ratio. The invention allows substantially efficient combustion throughout the engine operating map. Various methods of changing the charge of air are disclosed.

17 Claims, 1 Drawing Sheet

(51) Int. Cl.
  *F02D 41/02*   (2006.01)
  *F01L 1/22*    (2006.01)
  *F01L 9/04*    (2006.01)
  *F02B 1/08*    (2006.01)
  *F02D 41/26*   (2006.01)
  *F01L 9/02*    (2006.01)
  *F02D 41/00*   (2006.01)

(52) U.S. Cl.
  CPC ............ *F02B 1/08* (2013.01); *F02D 41/0002* (2013.01); *F02D 41/023* (2013.01); *F02D 41/26* (2013.01); *F16H 63/502* (2013.01); *F01L 1/143* (2013.01); *F01L 9/025* (2013.01); *F02D 2041/001* (2013.01); *F02D 2250/21* (2013.01)

(56) References Cited

U.S. PATENT DOCUMENTS

| | | | |
|---|---|---|---|
| 5,184,577 A | 2/1993 | Kato et al. | |
| 2003/0005901 A1* | 1/2003 | Katayama | F01L 1/26 123/90.17 |
| 2003/0060328 A1* | 3/2003 | Beaty | B60W 10/06 477/109 |
| 2004/0129239 A1* | 7/2004 | Yoshikawa | F01L 1/3442 123/90.17 |
| 2005/0192154 A1* | 9/2005 | Sakamoto | B60W 10/06 477/109 |
| 2007/0032340 A1 | 2/2007 | Hrovat et al. | |

FOREIGN PATENT DOCUMENTS

| | | |
|---|---|---|
| DE | 4324837 A1 | 1/1995 |
| EP | 2511504 A1 | 10/2012 |
| JP | 56141030 A | 11/1981 |
| JP | H04303153 A | 10/1992 |
| JP | 2005337263 A | 12/2005 |
| JP | 2008115871 A | 5/2008 |
| JP | 2012117474 A | 6/2012 |
| WO | 03/024736 A1 | 3/2003 |

OTHER PUBLICATIONS

Combined Search and Examination Report under Sections 17 and 18(3) for Application No. GB1319018.6 dated May 28, 2014.

* cited by examiner

MANAGING SHIFT ENERGY IN A TRANSMISSION OF A VEHICLE

TECHNICAL FIELD

The present invention relates to automatic and automated transmissions having multiple speed ratios selectable one at a time by a suitable control system. Such transmissions are commonly provided in vehicles. The invention discloses a method of managing the torque output of an engine, a system for implementing the method, and a vehicle incorporating the system.

BACKGROUND TO THE INVENTION

Vehicle transmissions are generally classed as manual or automatic. In a manual transmission, the vehicle driver determines the speed and smoothness of a ratio change, principally by careful control of a disengageable clutch.

In an 'automatic' transmission, such ratio changes are determined by a control system, in which the rate of de-clutching and re-clutching is not determined by the vehicle driver. Such transmissions may generally be operated in fully automatic mode, or permit a driver to initiate a ratio change on demand. Automated manual transmissions, that is to say manual transmissions having actuators to move a shift lever and clutch, fall into the automatic class for the purpose of the present invention by virtue of the provision of a control system for de-clutching and re-clutching drive.

It has long been realised that management of energy during a ratio shift is somewhat problematic. In a manual transmission a vehicle driver manages energy transmitted through the clutch by slipping the clutch just sufficiently to ensure smooth disengagement and re-engagement of drive. Generally speaking the driver will make a ratio change as quickly as possible, whilst avoiding an abrupt take-up of drive, which could be uncomfortable for vehicle occupants. A prolonged take-up of drive should generally be avoided so as to obviate excessive wear of the clutch. A driver must also deal with variations of load and gradient, and avoid an excessive increase in engine speed if passing through a neutral.

Ensuring appropriate shift energy during an automatic ratio change is not an easy task because of the wide variations of vehicle use, and also because clutch performance may vary due to age and other external factors, such as temperature. In particular, engine torque must generally be modulated to meet the instant demand of the transmission, so that for example a newly selected speed ratio is neither engaged too slowly nor too quickly. A variation in the speed of clutch engagement may be required depending upon, for example, accelerator pedal position.

Systems and methods of determining the engine torque requirement during a ratio change are known, and form no part of the present invention. Engine torque requirement can for example be contained in a look-up table of an engine electronic control unit (ECU), or determined by reference to an appropriate algorithm, having regard to conventional factors such as engine speed, road speed, and driver demand. Generally speaking a request for a change in torque demand should be implemented at the engine as rapidly as possible, and substantially instantly.

In a gasoline engine, rapid response to demands for torque change is affected by the volume of air in the inlet manifold, downstream of the usual throttle valve and upstream of the engine inlet valve(s). Responding to a demand for torque change by changing the position of the throttle valve may be characterized as 'slow' since the air already in the inlet manifold will affect engine power output for the next few combustion events. Eventually the volume of inlet air to the cylinder(s) will change as the throttle valve is adjusted, so that the torque output matches demand; however this response rate is not sufficiently fast to meet requirements during a change of speed ratio in a transmission.

One combustion factor which can be quickly changed is the timing of an ignition spark at the sparking plug. The speed of response may be at least an order of magnitude faster than the effect of changing throttle valve position, and may be effected within one TDC (top dead centre) of the engine.

In order to ensure a fast response to a demand for torque reduction during a ratio change, it is known to change ignition timing to reduce the power produced during a combustion event, in anticipation that an increase in power will be required as the new ratio is engaged. The increase in power can be quickly achieved by changing ignition timing to the optimal position for efficient combustion, without waiting for the volume of air to be increased. A fast response of this kind can be implemented cylinder by cylinder, so that successive firing events of a multi-cylinder engine may have different timing of the ignition spark.

Thus, by way of example, a multi-cylinder engine may be always assumed to be subject to an imminent torque-down demand followed by a torque-up demand to the original level, during a speed ratio upshift. Fuelling is generally commensurate with air volume in order to achieve stoichiometric combustion.

The torque-down demand is required, in order to avoid driveline shock or shunt, and is implemented by a retardation of the timing of the ignition spark; a torque-up demand is implemented by a re-advancement of the timing of the ignition spark. This conventional solution, whilst effective, has the effect of reducing combustion efficiency during the period of deliberate ignition retardation, with the consequence of a reduced torque output. However, inefficient combustion results in additional waste heat to be absorbed by the engine cooling system, increased fuel consumption, and unnecessary noxious exhaust emissions. This problem is exacerbated in current multi-speed transmissions, which may have as many as nine to ten forward speed ratios, with a consequent increase in the number of up and down changes which are required during normal driving, as compared with a conventional four or five speed transmission.

What is required is a means of providing rapid response to a demand for a reduction or an increase in engine torque, but which does not rely upon the inefficient combustion method noted above.

SUMMARY OF THE INVENTION

In an aspect there is provided a method of managing the torque output of an engine during a step change of speed ratio in an automatic transmission thereof, said engine including an active tappet for an inlet valve thereof, the method comprising detecting commencement of a change of current speed ratio in said transmission; commanding said active tappet to reduce the volume of air available for combustion in said engine; detecting engagement of a subsequent speed ratio; and commanding said active tappet to increase the volume of air available for combustion in said engine.

An active tappet provides for substantially immediate change of operation of the associated valve, independent of a camshaft or other valve control drive, on an event by event basis. Such a tappet may be hydraulic, and include a chamber whose volume is controlled by an electrically actuated valve, such as a bleed valve, responsive to a command from an engine ECU.

In an embodiment the volume of air entering the engine is changed by commanding the active tappet to vary valve lift. In another embodiment variation is by changing opening duration. In another embodiment variation is by changing the timing of valve opening and/or valve closing. These embodiments may be used in conjunction, in any desired combination to achieve a desirable volume and rate of in-flow of air.

It is envisaged that a prior art method of determining the amount of torque reduction and torque increase, by variation of ignition timing, may be used as an indication of the necessary variation of the active tappet used in the invention. The required amount of torque change may for example be held in a look-up table or generated by an algorithm according to empirical observations of a test engine and transmission subjected to suitable variations of operating condition. This data may be held in an electronic shift change map or the like.

The present invention provides a method of managing shift energy within permissible limits, whilst also ensuring that the vehicle engine operates at substantially optimal efficiency during a speed ratio change. The invention allows the correct volume of air to be introduced into the cylinder at each engine combustion event, so as to permit generation of the required torque for a given engine speed at the optimal ignition timing. Deliberate retarding of ignition timing to ensure that excess torque is not generated is generally avoided.

Most importantly the invention provides a 'fast' response to torque demand since the active tappet is able to respond to a change request within one firing event, and accordingly a cylinder by cylinder strategy can be adopted in a multi-cylinder engine, in contrast to prior 'slow' systems reliable upon a camshaft or throttle valve related change.

The method of the invention may also include a variation of the timing of an ignition spark if to do so would not materially affect the efficiency of combustion, but could have beneficial effects upon the speed ratio change, or if the response time associated with variation of an active tappet is insufficient to meet the demand for a torque decrease or increase.

Such an arrangement may for example improve the perceived smoothness of a ratio change to a vehicle driver and occupants, or allow a beneficial ramping-down and ramping-up of engine torque.

A beneficial consequence is that the invention avoids the generation of waste heat associated with inefficient combustion during a ratio change. The vehicle cooling system is accordingly placed under a lower load. Furthermore undesirable exhaust emissions are reduced because inefficient combustion is obviated by the invention.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF DRAWINGS

Other features of the invention will be apparent from the following description of an embodiment illustrated by way of example only in the accompanying drawings in which.

DESCRIPTION OF EMBODIMENT

Figure 1:
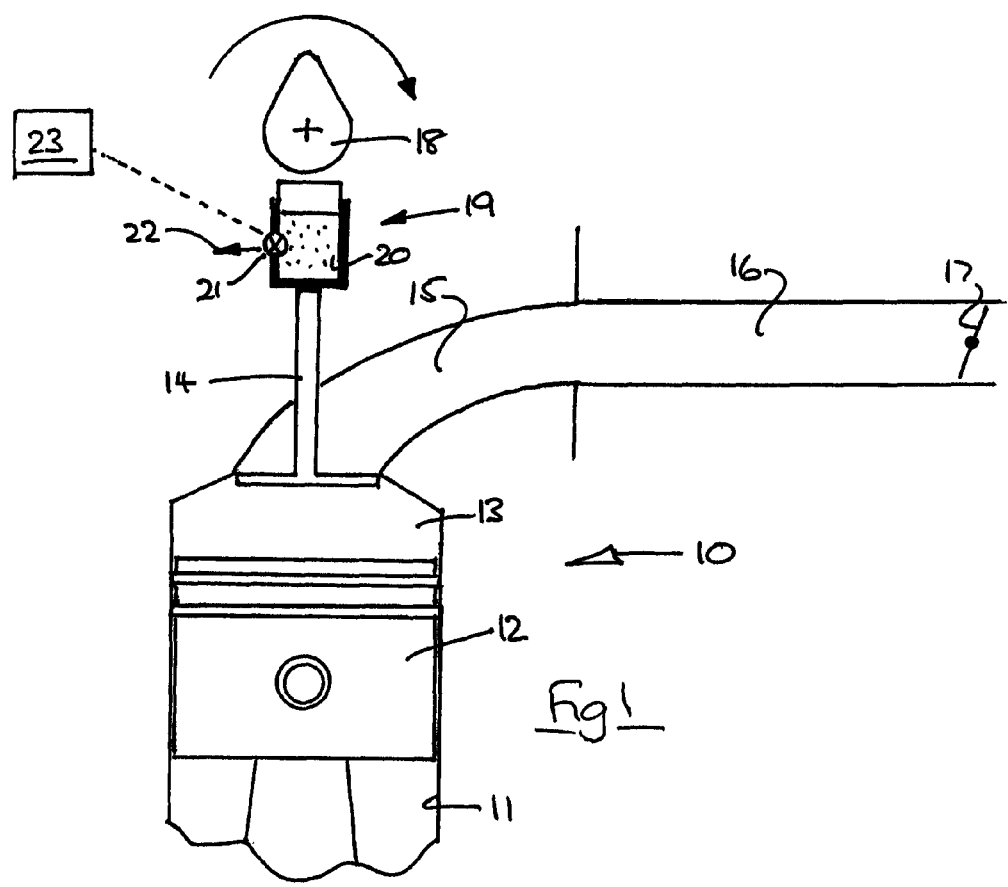
FIG. 1 shows schematically the inlet arrangement of an engine to which the present invention may be applied.

With reference to the drawings, an internal combustion engine 10 has a cylinder 11 within which a piston 12 reciprocates. A combustion chamber 13 is defined above the piston, and contains a poppet valve 14 which is opened to admit air from an inlet port 15. The inlet port is fed from an inlet manifold 16, at the mouth of which is provided a throttle valve 17.

The poppet valve 14 is closed by a spring (not shown), and is opened by action of a rotatable cam 18 which is conventionally provided by a lobe of a camshaft. Between the cam 18 and the valve 14 is provided a tappet 19.

The general arrangement of FIG. 1 is very common, and for ease of illustration certain other components, such as a corresponding poppet exhaust valve, are not illustrated. Conventionally the tappet 19 is solid, and may be characterized as passive. Hydraulic tappets are also known to provide a predetermined valve clearance.

The tappet of FIG. 1 is however active, and is characterized by a hydraulic chamber 20 whose volume is determined according to opening and closing of a bleed valve 21 which allows escape of fluid as indicated by arrow 22. The chamber 20 receives a constant supply of oil under pressure, and by varying the opening of the bleed valve over time, the instant volume of oil in the chamber can be changed to affect the lift, duration and timing of the operation of the inlet valve. It will be understood that the active tappet may enhance, oppose or neutralize the effect of the cam 18. The kind of active tappet is not important, the tappet of FIG. 1 being by way of example, save that it should permit fast variation of valve lift on an event basis. Thus it is envisaged that valve lift may be varied at each successive opening thereof, if required, for each cylinder of a multi-cylinder engine.

One example of an active tappet is disclosed in EP-A-2511504, and relies upon an electro-hydraulic device. Command of the active tappet is by an ECU 23.

Multiple inlet valves may be provided for the or each cylinder, and one or more such valves may be actuated by an active tappet, as required.

In use the admission of air into the engine is generally controlled via the throttle valve 17, which in turn is commanded by the ECU 23 according to conventional control parameters such as accelerator pedal position, altitude, air temperature and the like. It will be understood an alteration of the position of the throttle valve 17 changes the rate of air inflow, but does not immediately influence the amount of air admitted to the combustion chamber because of the air volume contained in the inlet manifold 16 and inlet tract 15.

In a prior art method of responding to a change of torque demand, the inlet valve lift is determined by a fixed length tappet (i.e. a passive tappet), and the timing of valve opening and closing by the profile of the cam 18.

Air flow through the engine may be greater than required to generate the torque demanded, but the torque generated is reduced by retarding the ignition timing.

This prior technique is particularly applicable at engine idling speed, where a torque-up demand can be expected.

In response to a torque-up demand, ignition timing is advanced. In consequence combustion becomes more efficient, as the ignition timing approaches the optimum. Ignition timing can be varied very quickly, and accordingly the response of the engine to the increased demand for torque is rapid (within one TDC).

It will be understood that in this simplified explanation of the prior technique, certain control aspects are not fully considered. For example it is assumed that engine torque can be precisely controlled according to the illustration whereas in practice it may vary slightly and continuously within upper and lower limits. Ignition timing is generally varied on a cylinder by cylinder basis to achieve a fast response to a torque-up demand, but with the risk of combustion inefficiency.

In the invention, by virtue of the active tappet, whereby for example valve lift is substantially reduced to restrict the volume of air admitted to the cylinder, the air charge is commensurate with the torque demand if combusted substantially at full efficiency. Ignition timing has sufficient advance to ensure substantially efficient combustion. For an increase in torque demand, the valve lift may be increased to enlarge the air charge.

Cumulative exhaust emissions, absent any other consideration, rise at a reduced rate by virtue of operation of the active tappet with lower fuel consumption and reduced exhaust emissions.

Adjustment of valve lift is very rapid, and the response is commensurate with the response of a variation in ignition timing. The response time is fast enough to meet the required specification, and generally about an order of magnitude better than a response based on prior methods of adjusting valve operation or of adjusting a throttle valve.

As a consequence of an increase in valve lift, the aspiration of air into the engine is increased, so that greater torque results from combustion. Ignition timing may be retarded slightly to ensure optimum combustion. Operation of successive inlet valves may be individually varied to ensure a smooth rapid torque change.

In a multi-cylinder engine, active tappets are provided on inlet valves of each cylinder and are activated independently. Accordingly cylinder by cylinder adjustment is possible so that torque output may track demand very closely. The air charge permitted by operation of successively opening inlet valves may be different to permit a ramping-up and ramping-down of the effect of the invention, according to known methods of hysteresis control.

Inefficient combustion by deliberate retardation of ignition timing, inevitably introduces additional waste heat to the engine cooling system, which typically relies upon liquid coolant and a coolant/air radiator.

The efficient combustion of the invention provides a reduced amount of waste heat, with the consequence that volume of the coolant and the coolant air radiator may be comparatively smaller.

The use of active inlet valve tappets on one or more inlet valves of each cylinder of an internal combustion engine can be used alone to ensure a fast response to a torque-up and torque-down demand. However additional variation of ignition timing to ensure spark optimisation and ignition efficiency may also be a useful technique.

Figure 2:
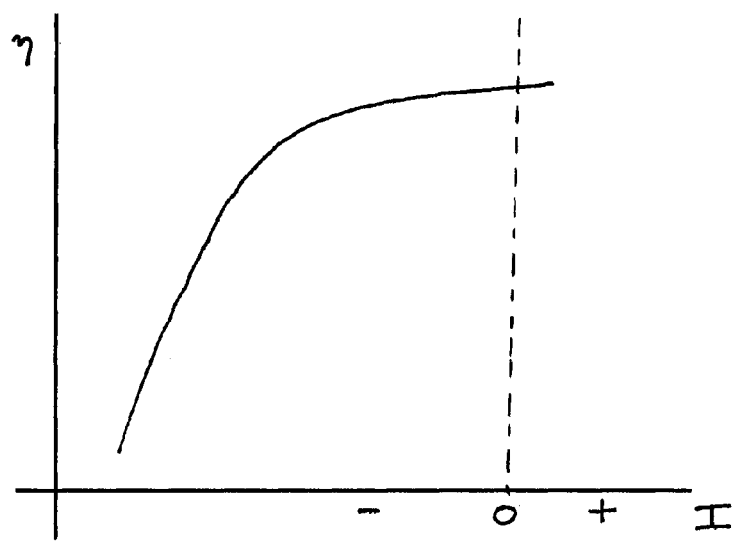
FIG. 2 illustrates graphically a relationship between ignition timing and combustion efficiency.

FIG. 2 illustrates that combustion efficiency does not fall linearly with spark retardation. Efficiency ($\eta$) is plotted against ignition timing I with the zero point indicating spark timing for optimum combustion; to the left of the zero point ignition timing is retarded (−), and to the right ignition timing is advanced (+).

It will be observed that initially, retarding of ignition timing has relatively little effect upon efficiency of combustion, and accordingly a combination of adjustment of ignition timing and use of an active tappet is available for controlling torque output within a narrow band. The amount of permissible retardation will change according to the particular engine and the load/speed operating map thereof, but may be less than 15°, or less than 10°, or less than 5°.

Admission of fuel to the cylinders is not described above, but known methods may be employed to ensure that fuel admission is commensurate with the air charge, so as to achieve substantially stoichiometric combustion. For example the ECU 23 may command an injection of fuel commensurate with the air charge commanded via the bleed valve 21.

The foregoing example describes a variation of valve lift to vary the volume of air admitted via the inlet valve 14; duration of valve opening is determined by the profile of the cam 18.

However it will be understood that the bleed valve may be used to counter or enhance the action of the cam by for example delaying valve opening and valve closing. In one example fluid may be allowed to bleed from the chamber to precisely counteract the lifting effect of the cam.

It will thus be understood that the volume of air admitted into the cylinder may additionally, or alternatively, be varied by changing the duration of valve opening, and/or by changing the timing of valve opening and of valve closing.

The invention is typically used for a vehicle engine, though application to non-vehicle installations is also envisaged.

Furthermore, in a practical vehicle installation, it is envisaged that the possibility of substantial variation of ignition timing will be retained, not only to allow efficient combustion throughout the range of engine speed, but also to provide redundancy in case of an error or fault relating to the active tappet or to the control system thereof.

The invention accordingly allows for rapid modulation of engine torque during an automatic speed ratio change, without the risk of inefficient combustion which is associated with the prior art method of adjustment of the timing of an ignition spark.

Variations are possible, and the invention is not limited to the example described above.

Aspects of the invention will be apparent from the numbered paragraphs that follow:

1. A method of managing the torque output of an engine during a step change of speed ratio in an automatic transmission thereof, said engine including an active tappet for an inlet valve thereof, the method comprising:
   detecting commencement of a change of current speed ratio in said transmission;
   commanding said active tappet to reduce the volume of air available for combustion in said engine;
   detecting engagement of a subsequent speed ratio; and
   commanding said active tappet to increase the volume of air available for combustion in said engine.
2. A method according to aspect 1 wherein detecting commencement of a change of current speed ratio is by detecting de-clutching of the engine.
3. A method according to aspect 1 wherein detecting engagement of a subsequent speed ratio is by detecting re-clutching of the engine.
4. A method according to aspect 2 wherein detecting engagement of a subsequent speed ratio is by detecting re-clutching of the engine.
5. A method according to aspect 1 applied to a spark ignition engine, the timing of commencement of combustion being determined by an ignition spark.

6. A method according to aspect 2 applied to a spark ignition engine, the timing of commencement of combustion being determined by an ignition spark.
7. A method according to aspect 3 applied to a spark ignition engine, the timing of commencement of combustion being determined by an ignition spark.
8. A method according to aspect 5 and including the step of adjusting the timing of an ignition spark to provide for substantially efficient combustion.
9. A method according to aspect 8 wherein a response to torque down demand includes:
retarding the timing of an ignition spark by less than 10°.
10. A method according to aspect 8 wherein a response to torque up demand includes:
advancing the timing of an ignition spark.
11. A method according to aspect 1 wherein the volume of air available for combustion is changed by one or more of:
changing the lift of said tappet,
changing the duration of opening of said inlet valve by control of said tappet,
changing the timing of opening of said inlet valve by control of said tappet,
changing the timing of closing of said inlet valve by control of said tappet,
changing the overlap of said inlet valve and an exhaust valve of said combustion chamber, by control of said tappet.
12. A method according to aspect 1 wherein said active tappet permits a variation of an immediately succeeding valve opening in consequence of a determination of a change in torque demand after a preceding valve opening.
13. A method of aspect 1 wherein said active tappet comprises a hydraulic chamber having an electrically commanded valve to vary the instant volume thereof.
14. A method according to aspect 13 wherein said hydraulic chamber is provided with a substantially unobstructed inlet flow of liquid oil, and includes a solenoid controlled bleed valve to vary outlet flow therefrom.
15. A method of aspect 1 applied to a multi-cylinder engine having an active tappet for an inlet valve of each cylinder thereof.
16. A method according to aspect 15, wherein each active tappet is independently commanded by an electronic control unit of said engine to change the volume of air available for combustion in a respective cylinder for successive combustion events in that cylinder.
17. A control system for implementing the method of any of aspects 1 to 16, said control system comprising an electronic control unit having a processor for electronically commanding said active tappet according to a torque demand parameter contained in a memory of said processor.
18. A reciprocating piston gasoline engine having a plurality of cylinders, an inlet valve for each cylinder and an active tappet for each said inlet valve, said engine being adapted for operation according to the method of any of aspects 1 to 16.
19. A vehicle incorporating the engine of aspect 18, and an electronic control system for implementing the method.
20. A vehicle incorporating the control system of aspect 17.

The invention claimed is:

1. A method of managing the torque output of an engine during a step change of speed ratio in an associated automatic transmission, said engine including at least one active tappet for an inlet valve, the method comprising:
detecting commencement of a change of a current speed ratio in said transmission;
commanding said active tappet to reduce a charge of air available for combustion in said engine by one or ore of:
changing a lift of said active tappet,
changing a duration of opening of said inlet valve by control of said active tappet,
changing a timing of opening of said inlet valve by control of said active tappet,
changing a timing of closing of said inlet valve by control of said active tappet,
changing an overlap of said inlet valve and an exhaust valve of said combustion chamber, by control of said active tappet;
detecting engagement of a subsequent speed ratio; and
commanding said active tappet to increase the charge of air available for combustion in said engine.
2. A method according to claim 1, wherein the engine comprises a plurality of cylinders and the at least one active tappet comprises an active tappet for an inlet valve of each of the cylinders.
3. A method according to claim 2, wherein the commanding is performed for each active tappet independently by an electronic control unit of said engine to change the charge of air available for combustion in a respective cylinder for successive combustion events in the respective cylinder.
4. A method according to claim 1, wherein detecting commencement of a change of current speed ratio comprises detecting de-clutching of the engine.
5. A method according to claim 1, wherein detecting engagement of a subsequent speed ratio comprises detecting re-clutching of the engine.
6. A method according to claim 1, wherein the engine comprises a spark ignition engine, and the method comprises determining a timing of commencement of combustion by an ignition spark.
7. A method according to claim 6, comprising adjusting a timing of an ignition spark to provide a selected type of combustion.
8. A method according to claim 7, wherein a response to a torque down demand includes retarding the timing of the ignition spark by less than 10°.
9. A method according to claim 7, wherein a response to a torque up demand includes advancing the timing of the ignition spark.
10. A method according to claim 1, wherein said active tappet permits a variation of an immediately succeeding inlet valve opening in consequence of a determination of a change in torque demand after a preceding inlet valve opening.
11. A method of claim 1, wherein said active tappet comprises a hydraulic chamber having an electrically commanded valve to vary an instant volume of the hydraulic chamber.
12. A method according to claim 11, wherein said hydraulic chamber is provided with a substantially unobstructed inlet flow of liquid oil, and said active tappet includes a solenoid controlled bleed valve to vary outlet flow from the hydraulic chamber.
13. A control system, comprising:
an electronic control unit having a processor and a memory associated with the processor, the processor being electronically configured to command an active tappet according to a torque demand parameter contained in the memory, said electronic control unit being configured to control at least a portion of operation of an engine, said electronic control unit being configured to:

detect commencement of a change of a current speed ratio in said transmission; command said active tappet to reduce a charge of air available for combustion in said engine by one or more of:
    changing a lift of said active tappet,
    changing a duration of opening of said inlet valve by control of said active tappet,
    changing a timing of opening of said inlet valve by control of said active tappet,
    changing a timing of closing of said inlet valve by control of said active tappet,
    changing an overlap of said inlet valve and an exhaust valve of said combustion chamber, by control of said active tappet;
detect engagement of a subsequent speed ratio; and
command said active tappet to increase the charge of air available for combustion in said engine.

14. A reciprocating piston gasoline engine, comprising:
a plurality of cylinders;
an inlet valve for each cylinder; and
an active tappet for each said inlet valve,
    said engine being adapted for operation according to the method comprising:
    detecting commencement of a change of a current speed ratio in an associated transmission;
commanding said active tappet to reduce a charge of air available for combustion in said engine by one or more of:
    changing a lift of said active tappet,
    changing a duration of opening of said inlet valve by control of said active tappet,
    changing a timing of opening of said inlet valve by control of said active tappet,
    changing a timing of closing of said inlet valve by control of said active tappet,
    changing an overlap of said inlet valve and an exhaust valve of said combustion chamber, by control of said active tappet;
    detecting engagement of a subsequent speed ratio; and
    commanding said active tappet to increase the charge of air available for combustion in said engine.

15. A vehicle comprising:
an engine;
a transmission;
at least one active tappet for an inlet valve; and
an electronic control unit configured to:
    detect commencement of a change of a current speed ratio in said transmission;
    command said active tappet to reduce a charge of air available for combustion in said engine by one or more of:
        changing a lift of said active tappet,
        changing a duration of opening of said inlet valve by control of said active tappet,
        changing a timing of opening of said inlet valve by control of said active tappet,
        changing a timing of closing of said inlet valve by control of said active tappet,
        changing an overlap of said inlet valve and an exhaust valve of said combustion chamber, by control of said active tappet;
    detect engagement of a subsequent speed ratio; and
    command said active tappet to increase the charge of air available for combustion in said engine.

16. A method of managing the torque output of a spark ignition engine during a step change of speed ratio in an associated automatic transmission, said engine including at least one active tappet for an inlet valve, the method comprising:
    detecting commencement of a change of a current speed ratio in said transmission; commanding said active tappet to reduce a charge of air available for combustion in said engine;
    determining a timing of commencement of combustion by an ignition spark
    detecting engagement of a subsequent speed ratio; and
    commanding said active tappet to increase the charge of air available for combustion in said engine.

17. A method of managing the torque output of an engine comprising a plurality of cylinders during a step change of speed ratio in an associated automatic transmission, said engine including an active tappet for an inlet valve of each of the cylinders, the method comprising:
    detecting commencement of a change of a current speed ratio in said transmission;
    commanding each said active tappet to reduce a charge of air available for combustion in said engine, wherein the commanding is performed for each active tappet independently by an electronic control unit of said engine to change the charge of air available for combustion in a respective cylinder for successive combustion events in the respective cylinder;
    detecting engagement of a subsequent speed ratio; and
    commanding said active tappet to increase the charge of air available for combustion in said engine.

\* \* \* \* \*

UNITED STATES PATENT AND TRADEMARK OFFICE
CERTIFICATE OF CORRECTION

PATENT NO. : 9,777,651 B2  
APPLICATION NO. : 15/032084  
DATED : October 3, 2017  
INVENTOR(S) : Nick Brockley Page 1 of 1

It is certified that error appears in the above-identified patent and that said Letters Patent is hereby corrected as shown below:

On the Title Page

In item (73) Assignee, Line 1;   replace "JAQUAR" with --JAGUAR--

In the Claims

In Claim 1, Column 8, Line 2;   replace "ore" with --more--

In Claim 1, Column 8, Line 12;  replace "said combustion chamber" with --a combustion chamber--

In Claim 13, Column 9, Line 2;  replace "said transmission" with --a transmission--

In Claim 13, Column 9, Line 6;  replace "said inlet" with --an inlet--

In Claim 14, Column 9, Line 37; replace "said combustion chamber" with --a combustion chamber--

Signed and Sealed this  
Twenty-ninth Day of October, 2019

Andrei Iancu  
*Director of the United States Patent and Trademark Office*